Dec. 10, 1968     R. B. COSTA     3,415,453

SWIRL DEVICE FOR SPRINKLER HEADS

Filed March 13, 1967

ROBERT B. COSTA
INVENTOR.

BY Lyon & Lyon
ATTORNEYS

# United States Patent Office 3,415,453
Patented Dec. 10, 1968

3,415,453
SWIRL DEVICE FOR SPRINKLER HEADS
Robert B. Costa, Covina, Calif., assignor to Anthony Manufacturing Corp., Glendora, Calif., a corporation of California
Filed Mar. 13, 1967, Ser. No. 622,681
4 Claims. (Cl. 239—465)

ABSTRACT OF THE DISCLOSURE

A swirl device formed of two identical disks to provide helical swirl channels having circumferentially overlapping walls. Each disk has a partial screwthread so disposed that when the disks are joined, the screwthreads are out-of-phase thereby to provide an interference fit on an adjustment screwthreaded through the disks.

Background of the invention

Swirl devices in the form of single piece disks or plates are commonly used in sprinklers. One of the better types is formed by milling multiple pitch helical channels in a brass bar, cutting the bar into disks, then providing a central screwthreaded bore which receives an adjustment or set screw. This type is expensive to manufacture; also, some degree of frictional restraint is required to enable the set screw to remain in position. As a uniform, yet not excessive, interference fit screwthread is difficult to attain, it is customary to dip the screwthread in a suitable plastic material while a fluid state. This is satisfactory for a first adjustment, but after very few adjustments, the plastic works free and the set screw is poorly held.

Summary of the invention

The present invention is directed to a swirl device which is formed by two easily molded plastic disks; more particularly, although screwthreads and circumferentially overlapping helical channels are provided in the assembled device, each disk is so formed that it is removed from the mold in an axial direction; that is without helical motion.

Furthermore, the two disks are identical and have interlocking means to permit assembly in only one interengaging relative position. Partial screwthreads are formed in each disk in such a manner that when the disks are joined, the partial screwthreads are out-of-phase so that when a set screw is screwthreaded through the disks, the partial screwthreads are distorted slightly and provide an interference fit with the set screw.

The set screw performs two functions; first to hold the two disks of the swirl device together; second, by its axial adjustment, to control flow through an orifice located upstream from the swirl device.

Figure 1:
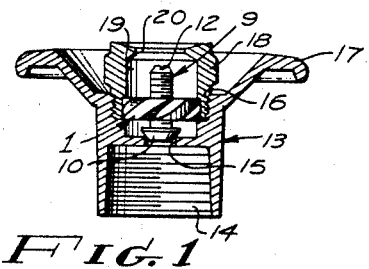
FIGURE 1 is a sectional view of a sprinkler head, showing the swirl device mounted therein.
Figure 4:
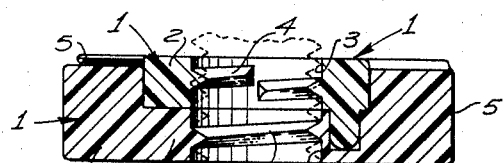
FIGURE 4 is a sectional view thereof, taken through 4—4 of FIGURE 3 and indicating the set screw by broken lines.
Figure 2:
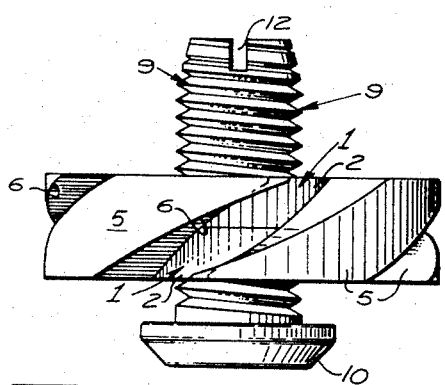
FIGURE 2 is an enlarged side view of the swirl device.
Figure 5:
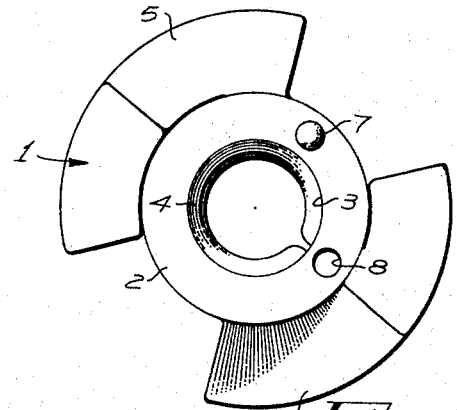
FIGURE 5 is a top view of the lowermost swirl disk.
Figure 3:
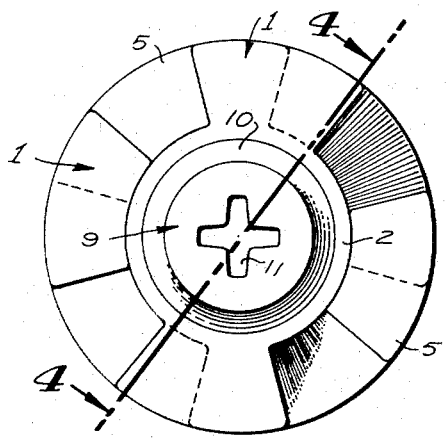
FIGURE 3 is an enlarged bottom view thereof.
Figure 6:
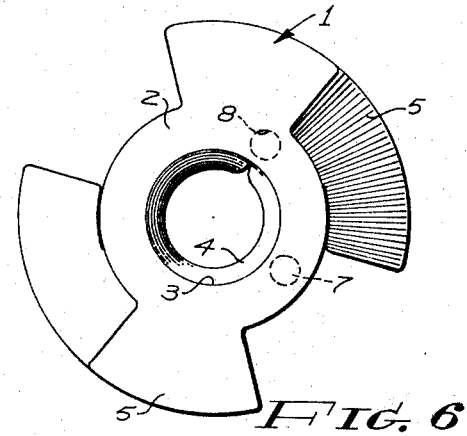
FIGURE 6 is a top view of the upper swirl disk shown in the position in which it is joined to the lower swirl disk.

The swirl device includes a pair of swirl disks 1 which are identical in construction. Each swirl disk includes a ring portion 2, having a central opening 3. Formed within the opening is a partial screwthread 4 occupying essentially one convolution.

Extending from diametrically opposite sides of the ring portion is a pair of helical vanes 5. One axial extremity of each vane is flush with the corresponding surface of the ring portion and occupies approximately one-eighth the circumference. Each vane has an axial dimension twice that of the ring portion, and thus projects axially beyond one side of the ring portion. The pitch of each vane is such that its overall circumferential extent is greater than 90°. Thus when the two ring portions are pressed together, the projecting segment of each vane, lies radially outward from the other ring portion, that is, the ring portion to which it is not attached. When assembled, the four helical vanes axially overlap and form helical channels 6.

The confronting surface of each ring portion is provided with a pin 7 and a recess 8 located approximately 90° apart, and so arranged that the pin of one ring portion fits into the recess of the other, and in so doing, predetermines the relative positions of the two partial screwthreads 4. The screwthread of each ring portion is so located that when the two ring portions are in contact, the partial screwthreads are out-of-phase. That is, the two partial screwthreads do not define exactly the same helical path.

The two swirl disks are adapted to receive a set screw 9, but in order for the set screw to pass the partial screwthreads, some distortion of the screwthreads occurs. In this regard, it should be noted that the swirl disks are molded from plastic material which is capable of yielding to the extent required to fit the set screw. In so doing, however, an interference fit is obtained so that the set screw does not move freely through the pair of swirl disks.

The set screw 9 is provided at one end with a metering head 10, which preferably is provided with a Phillips type recess 11. The opposite end is provided with an adjustment slot 12.

A typical sprinkler head in which the swirl device may be used is illustrated in FIGURE 1. The sprinkler head here illustrated includes a spray head body 13, having a central opening therethrough, provided with internal screwthreads 14 at one end for attachment to a pipe. Above the screwthreads 14, the opening through the body 13 is constricted to form an inlet port 15. Above the inlet port there is formed a screwthreaded socket 16, set within a flange 17.

A spray head 18 screwthreads into the socket 16 and clamps the swirl device. A swirl chamber 19 is formed above the device and the spray head is provided with an orifice 20.

It will be observed that inasmuch as the partial screwthread 4 does not exceed one convolution, that the parting line between the mold cavities in which the swirl disk is formed may follow the helical ridge of the partial screwthread so that the parts of the mold may be separated in an axial direction without requiring the swirl disk or any part of the mold to be unscrewed from either mold part.

Also, and similarly, the circumferential extremities of the helical vanes 5 do not overlap axially and the parting line may be located so that no helical motion of the swirl disk or any part of the mold is required in order that it be removed from the mold. Still further, although there are two possible positions in which the swirl disks may be joined, the pins 7 and recesses 8 permit assembly in only one of these positions which coincides with the proper spacing of the partial screwthreads 4 in order to provide the desired interference fit.

By reason of this interference fit, the set screw may be adjusted so that the metering head 10 is in the desired position relative to the inlet port 15 with assurance that the set screw will remain in place and not change its position due to the swirling motion of the water or vibration.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:
1. A swirl device for sprinkler heads, said device formed from a pair of swirl disks, each disk comprising:
   (a) a central ring having an internal screwthread;
   (b) a pair of diametrically disposed helical vanes;
   (c) said vanes extending axially beyond said ring a distance of essentially half the axial dimension of said vanes and spaced to receive the vanes of a similar disk therebetween to form a set of helical passages.

2. A swirl device for sprinkler heads, comprising:
   (a) a pair of swirl disks;
   (b) each disk including a central ring, and a pair of diametrically disposed helical vanes having twice the axial dimension of said ring;
   (c) said disks being assembled with one inverted with respect to the other and said rings disposed in coaxial stacked relation and the vanes of one disk interposed between the vanes of the other disk to define therebetween a series of helically directed channels.

3. A swirl device, as defined in claim 1, wherein:
   (a) each of said disks includes a screwthread occupying essentially one convolution;
   (b) a set screw joins said disks;
   (c) and the screwthreads of said disks are out-of-phase when said disks are stacked, thereby to produce an interference fit with said set screw.

4. A swirl device, as defined in claim 1, wherein:
   (a) each of said disks includes a screwthread occupying essentially one convolution;
   (b) a set screw joins said disks;
   (c) each of said disks is provided with a pin and a socket mating with the socket and pin of the other disk said sockets and pins being so located that said disks may be stacked in only one position in which the screwthreads of said disks are out-of-phase thereby to produce an interference fit with said set screw drawing said disks together.

No references cited.

ALLEN N. KNOWLES, *Primary Examiner.*

U.S. Cl. X.R.

239—488